United States Patent
Irvin

[11] Patent Number: 6,072,868
[45] Date of Patent: Jun. 6, 2000

[54] TELEPHONE WITH TOUCH-ANY-KEY DIALING MODE

[75] Inventor: David R. Irvin, Raleigh, N.C.

[73] Assignee: Ericsson, Inc., Research Triangle Park, N.C.

[21] Appl. No.: 09/124,277

[22] Filed: Jul. 29, 1998

[51] Int. Cl.[7] .................................................. H04M 1/00
[52] U.S. Cl. ............................................. 379/355; 379/52
[58] Field of Search ................................... 379/216, 355, 379/52, 368, 352; 455/564, 565

[56] References Cited

U.S. PATENT DOCUMENTS

| | | | |
|---|---|---|---|
| 5,033,078 | 7/1991 | Andoh | 379/100.14 |
| 5,157,719 | 10/1992 | Waldman | 379/356 |
| 5,754,602 | 5/1998 | Landry et al. | 379/355 |

FOREIGN PATENT DOCUMENTS

| | | | |
|---|---|---|---|
| 4111300A1 | of 1992 | Germany. | |
| 04265041 | 9/1992 | Japan | H04M 1/272 |
| 04334242 | of 1992 | Japan. | |
| 08289005 | of 1996 | Japan. | |
| 2278756A | of 1994 | United Kingdom. | |
| WO97/32426 | of 1997 | WIPO. | |

*Primary Examiner*—David R. Hudspeth
*Assistant Examiner*—Donald L. Storm
*Attorney, Agent, or Firm*—Coats & Bennett, P.L.L.C.

[57] ABSTRACT

A cellular telephone is provided with two dialing modes: the normal dialing mode, and a new dialing mode for impaired users called touch-any-key dialing. To prepare the phone for use in the touch-any-key dialing mode, a caretaker powers-on the phone, enters the phone's password, loads one, two, or three telephone numbers into the phone's speed-dial memory, and then selects the touch-any-key dialing mode. To dial a phone so prepared, a user enters keystrokes anywhere on the phone's keypad, the first of which keystrokes starts a timer. If one, two, or three keystrokes are detected within a predetermined interval of time, the phone dials the first, second, or third speed-dial numbers, respectively. If four or more keystrokes are detected in the interval, the keystrokes are compared with a pre-programmed password. If the password and the keystrokes match, the phone switches from touch-any-key dialing mode to normal cellular telephone dialing mode; if the keystrokes and the password differ, the phone persists in touch-any-key dialing mode.

28 Claims, 3 Drawing Sheets

TELEPHONE WITH TOUCH-ANY-KEY DIALING MODE

FIELD OF THE INVENTION

The present invention relates generally to telephones, such as cellular telephones, and more particularly to a simplified way of dialing telephones that is especially helpful to children, cognitively impaired adults, and physically impaired adults.

BACKGROUND OF THE INVENTION

Members of modern industrial societies have embraced today's advanced electronic consumer products so enthusiastically that people who are excluded from the use of such products have become, in a sense, excluded from the society's mainstream. Unfortunately, many of these products are difficult to operate. The video cassette recorder (VCR), for example, is often cited as the epitome of such a product, as it provides a highly desirable service but presents such a difficult operational interface that even fully capable adults are sometimes challenged by its intricacies. Cellular telephones fit this same general category.

The operation of modern cellular telephones over their full range of possibilities is inherently difficult because advanced users demand a complex collection of options and features. The problems of complexity are compounded by the problems of ergonomics that come with miniaturization—cellular telephones must be small in order to be readily portable, and therefore must have small keypads and tightly constrained visual displays.

Even the basic operation of dialing a cellular telephone is complex in its own right. First, the user typically enters a four-digit password, whose purpose is to unlock the phone's security apparatus designed to thwart unauthorized users. Next, the user enters the called-party telephone number digit-by-digit. Finally, the user enters a send command, which instructs the phone to forward the telephone number to a cellular base station. Not only is the traditional cellular telephone dialing process complex, it violates a pattern long established and well ingrained for dialing a wireline telephone.

As an alternate to the traditional cellular telephone dialing process, many cellular phones provide speed dialing. To set the stage for speed dialing, the user preloads a set of frequently dialed telephone numbers into the phone's non-volatile memory. Each speed-dial number is paired with an integer. To dial one of the preloaded numbers. the user first unlocks the phone by entering a password through its keypad, and then enters a recall or memory command followed by the integer paired with the desired number. In order to take advantage of this option, however, the user must remember the correct pairing of integers and telephone numbers, or must access this association through keystrokes guided by a menu comprising cryptic visual display messages, and must, of course, remember the password and understand the required sequence of keypad operations. So although the speed-dial mode may require the user to enter fewer keystrokes than the conventional dialing mode, the speed-dial mode is arguably more demanding cognitively.

In any case, the complexities of dialing a cellular phone are troublesome to a significant population of would-be users. Children, for example, are often unable to dial properly, as are adults who suffer from Alzheimer's disease or other cognitive impairment, or who are unable to engage the keypad or display because of physical limitations such as diminished dexterity or sight. Because of the complexity of dialing, people whose lives might well be significantly improved by having convenient access to a cellular telephone are effectively deprived of the cellular telephone's benefits.

In response to these concerns, special-purpose phones have been proposed that have the capability to dial only a limited set of prestored telephone numbers by way of a few oversized keys or buttons that replace the phone's conventional keypad, or through special keys appended to a standard telephone in addition to the standard keypad. Such phones, however, suffer the drawbacks as well as the advantages of being special-purpose. Simply put, special-purpose phones are relatively expensive as compared to conventional phones because they are not mass-market products and therefore cannot provide mass-market economy of scale. Consequently, the target population remains substantially excluded from the benefits of cellular telephone service for reasons of cost rather than ergonomics. Although in some circumstances a mass-market cellular telephone could be dialed or its password entered by a child's baby-sitter or an adult's caretaker, this approach is often completely unsatisfactory, as leaving the phone unprotected by the password and fully operational opens the risk that calls will be placed and charges incurred by unauthorized users.

Thus, a need remains to equip mass-market wireless telephones such as cellular telephones with a simplified dialing mode that retains the advantages of password protection, so that these phones can be conveniently and economically used by children, victims of Alzheimer's disease, the cognitively impaired, the partially sighted, and those whose fingers are unable to navigate the small keypad of today's products. This need is expected to become increasingly urgent in view of evident trends toward ever-smaller and ever-more-complex cellular telephones.

SUMMARY OF THE INVENTION

A cellular telephone is provided with two dialing modes: the traditional cellular telephone dialing mode referred to herein as the normal dialing mode, and a new dialing mode that provides limited but very simple dialing, which is referred to as touch-any-key dialing. In normal dialing mode, the phone is dialed in the normal manner by entering digits corresponding to the called party's number. The calling party must also enter a password to unlock the phone prior to entering the called party's number. In touch-any-key mode, stored telephone numbers are retrieved from memory based on the number of keystrokes regardless of the keys that are pressed. For example, one keystroke would indicate a first number stored in memory, two keystrokes would indicate a second number, etc.

To prepare the phone for use in the touch-any-key dialing mode, a caretaker powers-on the phone; enters the phone's password; loads one, two, or three numbers into the phone's speed-dial memory; and then selects the touch-any-key dialing mode. To dial a phone so prepared, an impaired user simply enters keystrokes anywhere on the phone's keypad, the first of which keystrokes starts a timer. If exactly one keystroke is detected within a predetermined interval of time, the phone dials the number stored in its first speed-dial memory. If exactly two keystrokes are detected during the interval, the phone dials the number stored in its second speed-dial memory. If exactly three keystrokes are detected during the interval, the phone dials the number stored in its third speed-dial memory. If four or more keystrokes are detected in the interval, the keystrokes are compared with a password. If the keystrokes match the password, the phone switches from touch-any-key dialing mode back to normal dialing mode. If the keystrokes do not match the password, the phone persists in touch-any-key dialing mode.

The present invention retains the advantages of password protection and yet equips a mass-market cellular phone to serve the needs of a small but important population, all without requiring change beyond a relatively minor software enhancement.

These and other aspects of the present invention will become apparent to those skilled in the art after reading the following description of the preferred embodiments when considered with the drawings.

DETAILED DESCRIPTION OF THE INVENTION

Figure 1:
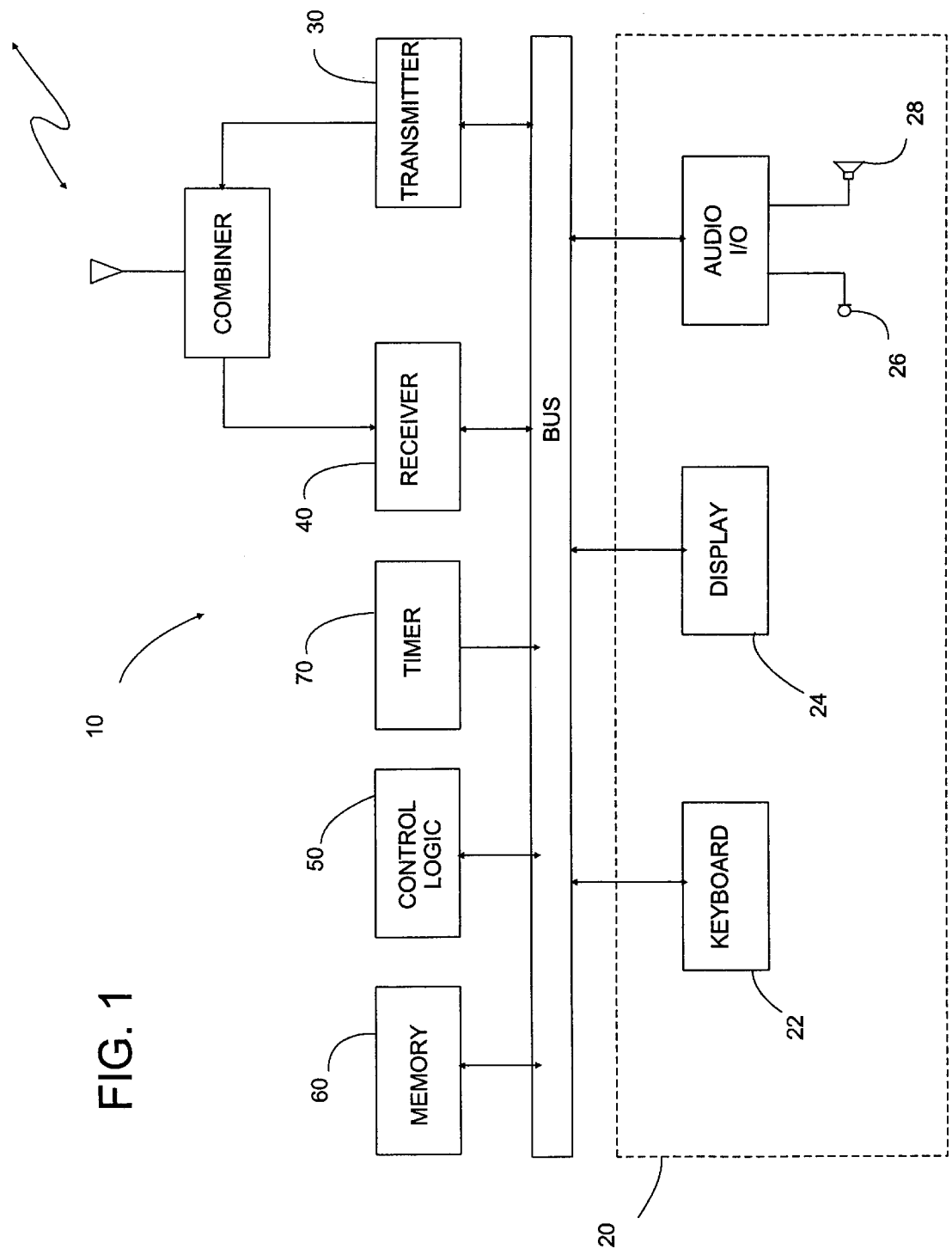
FIG. 1 shows the structure of a telephone according to the present invention.

Referring now to the drawings, FIG. 1 shows the structure of a telephone 10 that uses the touch-any-key dialing mode. The telephone 10 may be, for example, a fully functional radio transceiver capable of transmitting and receiving digital or analog signals in a cellular communication network. The telephone 10 includes a user interface 20, transmitter 30, a receiver 40, control logic 50, and a non-volatile memory 60.

The user interface 20 includes a keypad 22, a display 24, a microphone 26 and a speaker 28. The phone's user enters alphanumeric data and commands by pressing keys on the keypad 22, and receives visual prompts or other messages from the phone on the display 24. By methods well known, the user interacts with both the keypad 22 and the display 24 to configure the phone according to pre-established options under the direction of a menu, and to conduct the phone's operation once configured. The microphone 26 converts sounds to audio signals that are passed to the transmitter 30 for subsequent transmission. Speaker 28 converts received audio signals passed by the receiver 40 to sounds which can be heard by the user.

The transmitter 30 and receiver 40 may be, for example, a class 1 mobile phone transceiver capable of transmitting and receiving radio signals. The control logic 50 controls the operation of the user interface 20, transmitter 30 and receiver 40 according to instructions stored in the non-volatile memory 60. The non-volatile memory 60 also provides memory for storing data that is needed by the control logic 50 during operation of the phone 10, such as a user password and preprogrammed telephone numbers.

According to the present invention, the telephone 10 contains a timer 70 responsive to keystrokes entered on keypad 22. Although the timer 70 is shown as a separate element in FIG. 1 for the sake of clarity, in a preferred embodiment the function of the timer 70 is subsumed into the logic 50. The purpose and operation of the timer 70 are discussed below with reference to FIG. 3.

Figure 2:
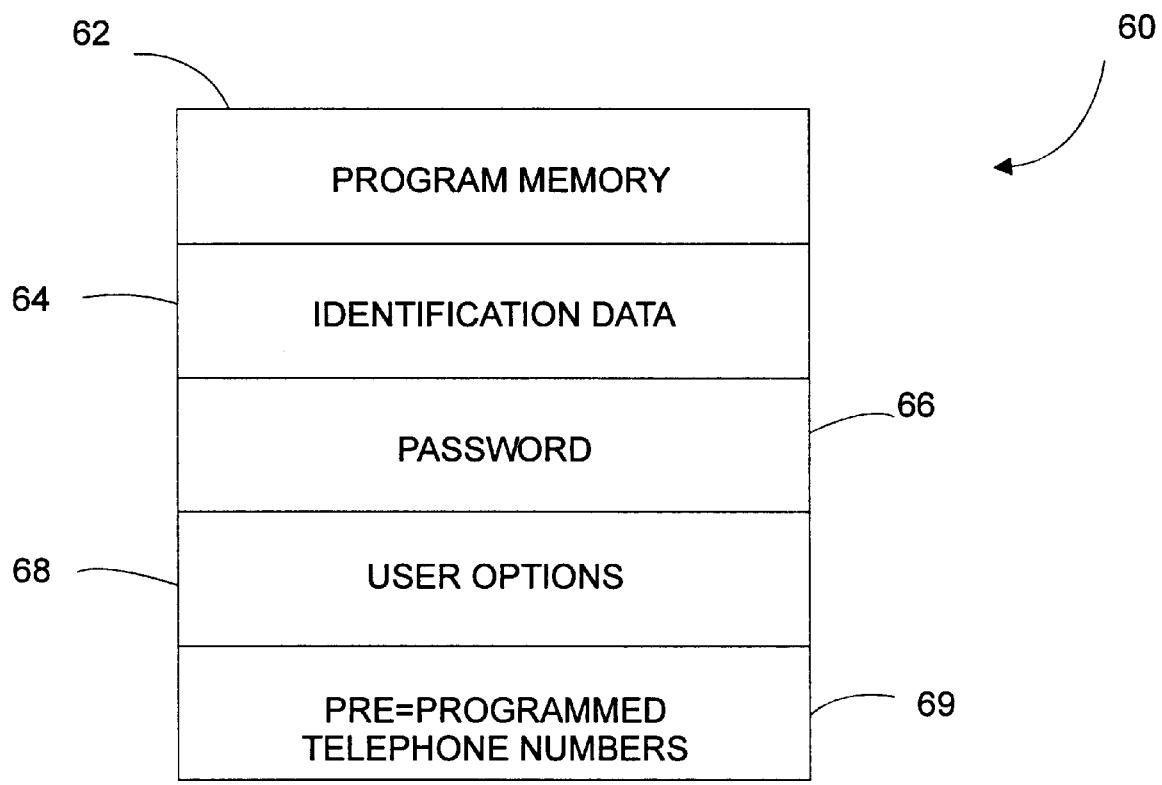
FIG. 2 shows the memory layout of the telephone of FIG. 1.

FIG. 2 shows the organization of the memory 60, which comprises program memory 62 for directing the operation of logic 50, and data memory for storing other information pertinent to the operation of the phone. The data memory includes a memory 64 for storing identifying data such as the phone's MSID, a memory 66 for storing a security password or PIN number, a memory 68 for storing user-selected options such as display font and language, and a memory 69 for storing pre-programmed telephone numbers. For clarity of illustration, FIG. 2 shows memory 60 as having a continuous address space and a single physical package. Those skilled in the art will recognize that a number of different physical packages and technologies may be advantageously employed, and that the address space need be neither continuous nor assigned in the particular order shown.

The telephone 10 of the present invention is programmed to operate in the same manner as a conventional telephone 10 in a normal dialing mode. In the normal dialing mode, the telephone 10 is dialed by manually entering the called party's number on the keypad, or alternatively, by invoking a speed-dial function. The telephone 10 of the present invention also includes a simplified dialing mode, referred to as the touch-any-key dialing mode, for children, cognitively impaired adults, and physically impaired adults. In the touch-any-key dialing mode, the telephone counts the number of keystrokes on the keypad. Based on the keystroke count, the telephone 10 retrieves a pre-programmed number from its memory 60. If the keystroke count equals one, a first number associated with the count of one is retrieved from memory 60. For example, if the keystroke count equals two, a second telephone number associated with a count of two is retrieved from memory 60. There is no limit to the number of pre-programmed numbers that can be accessed in this manner other than the size of the memory. However, the present invention is most practical when the number of pre-programmed telephone numbers is relatively small.

Figure 3:
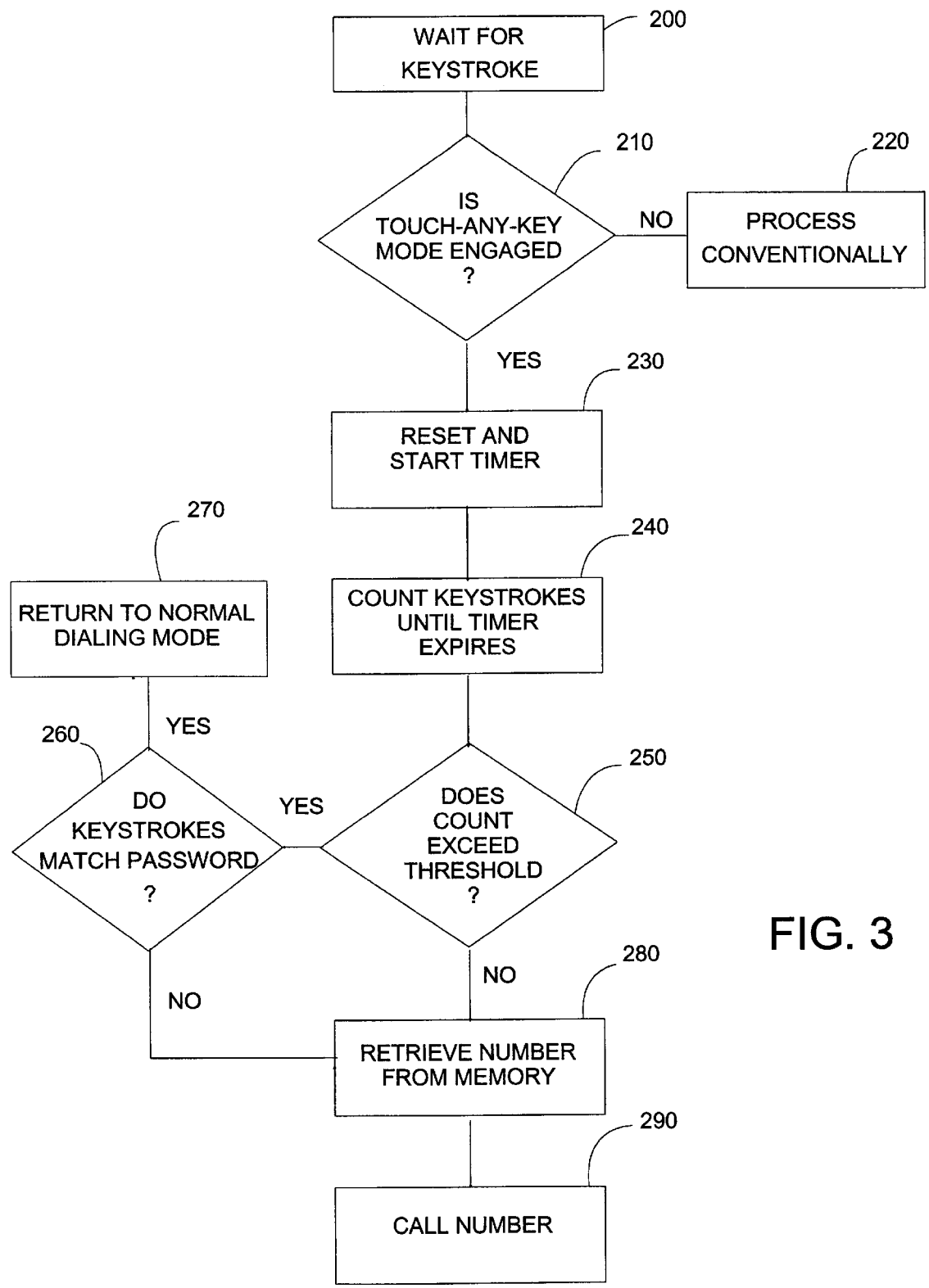
FIG. 3 is a flow diagram showing the operation of the phone in touch-any-key dialing mode.

FIG. 3 is a flow diagram illustrating the operation of the telephone 10. The dialing process is initiated when a keystroke is detected (block 200). A determination is made as to whether the touch-any-key dialing option has been engaged (block 210). If not, the cellular telephone 10 processes the keystroke by long established methods for the operation of cellular telephones (block 220). Otherwise, i.e., touch-any-key dialing has been engaged, the timer 70 is re-set to zero and started (block 230). For the duration of the pre-established interval established by timer 70, the number of keystrokes entered on keypad 22 is counted (block 240). In the preferred embodiment, the time interval is approximately three seconds and is subject to change by the user. At the end of the time interval, the keystroke count is compared to a predetermined threshold (block 250). In the preferred embodiment this threshold is four, and is subject to change by the user.

If the keystroke count during the time interval equals or exceeds the threshold, the keystrokes themselves are compared with a password held in memory 60 (block 260). If the keystrokes match the password, the touch-any-key dialing option is disengaged, and the phone switches to the normal dialing mode (block 270). In a preferred embodiment, a match between the keystrokes and the password in block 260 also disengages any conventional security provisions of the telephone 10 controlled by a password or PIN-number. Thus, in the preferred embodiment, the password referred to in block 260 and associated with the touch-any-key dialing option is the same as the password or PIN number associated with the traditional security features of the telephone 10. Note that it is not necessary to have password protection when in touch-any-key dialing mode, since the phone can place calls only to a few pre-programmed telephone numbers, and these numbers cannot be altered without returning to traditional cellular telephone dialing mode under password protection.

If the count of keystrokes during the interval is less than the threshold (block 250) or do not match the password (block 260), the appropriate telephone number corresponding to the numerical value of the keystroke count is retrieved from the speed-dial portion 69 of the memory 60 (block 280). For example, if the count of keystrokes is exactly one, then the first speed-dial number is recalled from the memory 69; if the count is two, the second speed-dial number is recalled from the memory 69; and likewise for a count of three. The selected telephone number is transmitted by way of the transmitter 30 to the base station over the wireless link (block 290). Upon receiving the telephone number, the base station sets-up a call over the PSTN according to well known methods.

It will be readily apparent to those skilled in the art that the details of the operation of the phone 10 can be modified in well-known ways. For example, instead of counting keystrokes during a preset time interval, the phone can time the interval between successive keystrokes. In this embodiment, the phone would begin counting keystrokes when the first keystroke is detected and continue counting keystrokes so long as the time interval between successive keystrokes does not exceed a predetermined interval, such as 0.5 seconds. Also, the timer can be started by events other than keystrokes. The counter can be stopped by events other than the expiration of a timer. The only essential requirement is that the phone maintains a keystroke count that is used to access pre-programmed telephone numbers. The details of starting and stopping the count are not material to the invention.

Although a preferred embodiment of the present invention has been described here in terms of cellular telephones for the sake of clarity, the invention applies to all kinds of communication devices that use a keypad to enter a called number. A telephone may be equipped with both the normal dialing mode and the inventive touch-any-key dialing mode of the present invention with selection between the two modes according to the user's wishes. Or, the telephone may be equipped with only the touch-any-key dialing mode. Furthermore, the invention may, of course, be carried out in specific ways other than those set forth herein without departing from the spirit and the essential characteristics of the present invention. Consequently, the present embodiments are to be construed in all aspects as illustrative and not restrictive. All changes coming within the meaning and equivalence range of the appended claims are intended to be embraced by these claims.

I claim:

1. A method of dialing a telephone having a keypad and a memory, comprising the steps of:
    a) storing one or more telephone numbers in said memory, wherein each of said telephone numbers is associated with a predetermined keystroke count;
    b) counting keystrokes entered on the keypad so as to generate a keystroke count;
    c) fetching the telephone number from said memory corresponding to said keystroke count, and
    d) calling the telephone number fetched from memory.

2. The method of claim 1 wherein the keystrokes are counted during a predetermined time interval.

3. The method of claim 2 further comprising the step of setting the predetermined time interval during which keystrokes are counted.

4. The method of claim 1 wherein the keystrokes are counted beginning with an initial keystroke and continuing so long as each succeeding keystroke is within a predetermined time interval of the preceding keystroke.

5. The method of claim 1 further comprising the step of comparing said keystrokes to a password when said keystroke count exceeds a predetermined threshold.

6. The method of claim 5 wherein the telephone switches to a normal dialing mode when said keystrokes match said password.

7. The method of claim 1 further comprising the step of comparing said keystrokes to a password.

8. The method of claim 7 wherein the telephone switches to a normal dialing mode when said keystrokes match said password.

9. The method of claim 1 further including the step of switching to a normal dialing mode in response to a predetermined user input.

10. The method of claim 9 wherein said predetermined user input is a predetermined sequence of keystrokes.

11. A telephone with simplified dialing, comprising:
    a) a memory for storing one or more telephone numbers, wherein each telephone number is associated with a predetermined keystroke count;
    b) a keypad for entering keystrokes;
    c) a counter for counting keystrokes entered on said keypad;
    d) logic for fetching a telephone number from said memory based on the number of keystrokes counted by said counter.

12. The telephone of claim 11 further including a timer for indicating the end of a predetermined time interval, said counter being operative to count the number of keystrokes occurring during said predetermined time interval.

13. The telephone according to claim 12 wherein said logic starts said timer upon the occurrence of an initial keystroke.

14. The telephone of claim 12 including means for entering the predetermined time interval.

15. The telephone of claim 14 wherein the predetermined time interval is entered by pressing keys on said keypad.

16. The telephone of claim 11 further including a timer for indicating the time interval between successive keystrokes, said counter being operative to count the number of keystrokes beginning with an initial keystroke and continuing so long as each succeeding keystroke is within a predetermined time interval of a preceding keystroke.

17. The telephone of claim 11 wherein said logic is operative to switch to a normal dialing mode in response to a predetermined user input.

18. The telephone of claim 11 wherein said logic is operative to switch to a normal dialing mode when said keystrokes entered by a user correspond to a predetermined password.

19. The telephone of claim 11 wherein said logic is operative to switch to a normal dialing mode when said keystroke count exceeds a predetermined threshold and said keystrokes entered by the user correspond to a predetermined password.

20. A telephone having a normal dialing mode and a touch-any-key dialing mode, comprising:
    a) a memory for storing one or more telephone numbers; wherein each telephone number is associated with a predetermined keystroke count;
    b) a keypad for entering keystrokes;
    c) a counter for counting keystrokes entered on said keypad;
    d) logic for dialing a stored number fetched from memory based on said keystroke count from said counter when in said touch-any-key mode, and for dialing a numbered entered on said keypad when in said normal dialing mode.

21. The telephone of claim 20 further including a timer for indicating the end of a predetermined time interval, said counter being operative to count the number of keystrokes occurring during said predetermined time interval.

22. The telephone according to claim 21 wherein said logic starts said timer upon the occurrence of an initial keystroke.

23. The telephone of claim 21 including means for entering the predetermined time interval.

24. The telephone of claim 23 wherein the predetermined time interval is entered by pressing keys on said keypad.

25. The telephone of claim 20 further including a timer for indicating the time interval between successive keystrokes, said counter being operative to count the number of keystrokes beginning with an initial keystroke and continuing so long as each succeeding keystroke is within a predetermined time interval of a preceding keystroke.

26. The telephone of claim 20 wherein said logic is operative to switch to a normal dialing mode in response to a predetermined user input.

27. The telephone of claim 20 wherein said logic is operative to switch to a normal dialing mode when said keystrokes entered by a user correspond to a predetermined password.

28. The telephone of claim 20 wherein said logic is operative to switch to a normal dialing mode when said keystroke count exceeds a predetermined threshold and said keystrokes entered by the user correspond to a predetermined password.

* * * * *